(12) United States Patent  (10) Patent No.: US 8,730,130 B1
Pray et al.  (45) Date of Patent: May 20, 2014

(54) SYSTEM AND METHOD FOR AUTOMATICALLY ALIGNING IMMERSIVE DISPLAYS

(75) Inventors: Richard E. Pray, Port Crane, NY (US);
Barry J. Williams, Vestal, NY (US);
David Thomas, Endicott, NY (US);
Mark A. Radley, Binghamton, NY (US)

(73) Assignee: RPA Electronic Solutions, Inc., Binghamton, NY (US)

( * ) Notice: Subject to any disclaimer, the term of this patent is extended or adjusted under 35 U.S.C. 154(b) by 945 days.

(21) Appl. No.: 12/628,274

(22) Filed: Dec. 1, 2009

Related U.S. Application Data

(60) Provisional application No. 61/200,989, filed on Dec. 4, 2008.

(51) Int. Cl.
*G09G 5/00* (2006.01)

(52) U.S. Cl.
USPC .............................................................. 345/8

(58) Field of Classification Search
USPC ........................................................ 345/7–9
See application file for complete search history.

(56) References Cited

U.S. PATENT DOCUMENTS

| | | | |
|---|---|---|---|
| 5,136,390 A | 8/1992 | Inova | |
| 6,208,938 B1 * | 3/2001 | Doerfel | 702/3 |
| 6,442,476 B1 * | 8/2002 | Poropat | 701/23 |
| 6,558,006 B2 | 5/2003 | Ioka | |
| 6,717,625 B1 | 4/2004 | Thielemans | |
| 6,814,448 B2 | 11/2004 | Ioka | |
| 6,859,547 B2 | 2/2005 | Mostert et al. | |
| 6,975,748 B2 | 12/2005 | Mostert et al. | |
| 7,097,311 B2 | 8/2006 | Jaynes et al. | |
| 7,119,833 B2 | 10/2006 | Jaynes | |
| 7,133,083 B2 | 11/2006 | Jaynes et al. | |
| 2003/0067537 A1 * | 4/2003 | Myers | 348/47 |
| 2003/0067587 A1 * | 4/2003 | Yamasaki et al. | 353/30 |
| 2004/0174373 A1 | 9/2004 | Stevens et al. | |
| 2005/0057741 A1 * | 3/2005 | Anderson et al. | 356/5.01 |
| 2005/0271299 A1 * | 12/2005 | Ajito et al. | 382/293 |
| 2007/0188719 A1 | 8/2007 | Jaynes et al. | |
| 2007/0195285 A1 | 8/2007 | Jaynes et al. | |
| 2007/0268306 A1 | 11/2007 | Webb et al. | |

* cited by examiner

*Primary Examiner* — William Boddie
*Assistant Examiner* — Carolyn R Edwards
(74) *Attorney, Agent, or Firm* — Mark Levy; Hinman, Howard & Kattell, LLP

(57) ABSTRACT

A system and method for automatically aligning immersive displays, including helmet-mounted displays, such displays creating composite images from at least one image source. A gimbal-mounted camera/rangefinder apparatus is used to create a high resolution three-dimensional (3D) map of the screen surface which, in turn, is used to generate geometric corrections of projected image segments. The rangefinder is typically a laser rangefinder and the laser element thereof can draw display channel outlines of the screen. The gimbal-mounted camera/rangefinder is used to automatically analyze a test pattern projected onto the screen, typically without geometric correction. Each defined point of the test pattern may then be "moved" to its proper location on the 3D screen map. Video signal processing, performed either in software or hardware, accomplishes geometric correction, edge blending, color (e.g., gamma) correction and intensity matching. Unique polygonal blend regions are used for edge blending.

19 Claims, 10 Drawing Sheets

SYSTEM AND METHOD FOR AUTOMATICALLY ALIGNING IMMERSIVE DISPLAYS

STATEMENT REGARDING UNITED STATES GOVERNMENT SPONSORED RESEARCH OR DEVELOPMENT

The United States government may have certain rights and interests in this invention in accordance with the provisions of one or more of the following SBIR contracts:

N61339-03-C-0047 awarded Apr. 10, 2003; N61339-04-C-0074 awarded May 27, 2004; N61339-04-P-0047 awarded Aug. 18, 2004; and N61339-05-C-0103 awarded Jun. 14, 2005. Each contract was awarded by NAVAIR Orlando TSD, 12350 Research Parkway, Orlando, Fla. 32826-3224.

FIELD OF THE INVENTION

The invention pertains to calibration systems and methods and, more particularly, to an automatic alignment system and method for displays combining images from one or more image sources.

BACKGROUND OF THE INVENTION

The term "immersive display" is used in virtual reality discussions to refer to a display that at least partially surrounds a viewer. Typically consisting of large, curved screens (possibly as long as 24 feet or more in length), an image projected thereupon completely fills the peripheral vision of a viewer. The term "spatially immersive wall" is sometimes applied to such screens.

Such displays, often also referred to as wide field of view (WFOV) displays, are widely used in training simulators to provide realistic visual imagery to a person being trained in the simulator. Many other applications exist for such immersive displays. Well known applications include control centers (e.g., traffic, power, shipboard, emergency service, factory operations, process control, military, etc.).

In immersive displays and other similar applications, it is, therefore, highly desirable to project or display a unified, composite image formed from image segments originating at one or more image sources (e.g., projectors). Often, such composite images must be projected onto a non-planar surface, for example onto a screen curved along at least one dimension. Such images may be produced by either front or rear projection onto the screen. Because of screen imperfections, projector anomalies, projector/screen alignment differences, etc., the multiple images, if projected "raw," do not yield an acceptable composite image. Further, color balance and brightness differences among multiple projectors further detract from a seamless, contiguous, composite image.

It is, therefore, common practice in installations designed to exhibit such composite images, to align and calibrate system components to overcome image distortions introduced from the aforementioned sources. Such calibration and alignment procedures often suffer from one or more common shortcomings. For example, most calibration and alignment procedures of the prior art are either extremely time consuming and/or inaccurate. Further, minute changes in one or more system components often requires recalibration.

Traditionally, a number of instruments are used for alignment of immersive visual displays. Transits may be used to verify absolute locations of display imagery with respect to design specifications. Often, at least two transits are needed for calibrating at a price in excess of $20K each. Luminance meters may be used to measure colorimetry for channel matching and edge blending. Large amounts of manual setup, measurement, and interpretation, followed by manual and/or computer based calculations provide feedback to the image source to correct parameters.

Recent additions to high end projector devices allow for individual channel alignment. Such projectors still lack the ability to handle cross channel parameter measurement and adjustment in highly immersive environments with many adjacent display channels.

As projector and associated image processing costs continue to fall, immersive displays are utilizing more and more channels, thereby making setup and maintenance costs for such systems increasingly higher. Each added channel brings increased complexity and more need for aligning and blending image segments in the display.

DISCUSSION OF THE RELATED ART

Several calibration schemes are the subject of United States patents.

U.S. Pat. No. 5,136,390 for ADJUSTABLE MULTIPLE IMAGE DISPLAY SMOOTHING METHOD AND APPARATUS, issued Aug. 4, 1992 to Peter J. Inova teaches a method and apparatus for establishing consistent image brightness, especially for a multiple video image seamless display, by storing a set of smoothing factors, one for each detail element of each image, in a memory. Upon projection, the smoothing factors are applied to the brightness components of the associated detail elements of each image. The smoothing factors are selected by applying a standard curve, coarse tuning major curve parameters in response to the appearance of the projected multiple image display, and fine tuning smoothing factors for specific detail elements, the locations of the detail elements being indicated by a cursor on the display.

United States Published Patent Application No. 2003/0067587 for MULTI-PROJECTION IMAGE DISPLAY DEVICE, published Apr. 10, 2003 upon application by Masami Yamasaki et al. provides an image processing device and method that includes an address displacement unit that translates an address of an output pixel into an address of an input pixel according to an address translation parameter, a readout unit that reads out an input pixel value according to the translated address of the input pixel according to an address-value parameter, and an output unit that outputs an output pixel value generated from the input pixel value.

U.S. Pat. No. 6,558,006 for IMAGE PROJECTION DISPLAY APPARATUS USING PLURAL PROJECTORS AND PROJECTED IMAGE COMPENSATION APPARATUS, issued May 6, 2003 to Ken Ioka provides a system wherein highly detailed image data from an input terminal is divided by an input image divider in accordance with projectors. The divided image data are subjected to compensation processing by an image compensator, using compensation data for the respective characteristics of the various types of output characteristics. The output characteristics are subjected to compensation processing using the compensation data for the various types of output characteristics stored in the compensation data memory unit. The image data for each projector subjected to compensation processing, after D/A conversion, are sent to respective projectors.

U.S. Pat. No. 6,175,625 for METHOD AND DEVICE FOR ADJUSTING ONE OR MORE PROJECTORS, issued Apr. 6, 2004 to Robbie Thielemans teaches a method for adjusting one or more projectors, each projector generating a number of light beams of different color, characterized in that the projected picture is automatically adjusted during normal use of the projector.

United States Published Patent Application No. 2004/0174373 for PREPARING DIGITAL IMAGES FOR DISPLAY UTILIZING VIEW-DEPENDENT TEXTURING, published Sep. 9, 2004 upon application by Randal S. Stevens et al. shows a computer program embodied on a computer-readable medium, a computer readable medium storing computer-executable instructions, and a computer data signal embodied in a carrier wave, all for providing a graphic image utilizing view-dependent texture data, including a graphic data code segment for providing data representing a graphic image and a texture data code segment in operational association with the graphic data code segment.

U.S. Pat. No. 6,814,448 for IMAGE PROJECTION AND DISPLAY DEVICE, issued Nov. 9, 2004 to Ken Ioka teaches image projection and display devices that include a plurality of projectors, a projection screen forming a focusing plane for the projected images from the plurality of projectors, mutually overlapping regions existing between the images, a test image storing section for storing prescribed test images, and an image capturing section for acquiring projected test images in which a prescribed test image is projected. The devices further include a correction data calculating section for calculating correction data for correcting the input images for the respective projectors, on the basis of the acquired test images, in such a manner that a uniform or continuous brightness is achieved across the whole projection area including the overlapping regions, a correction data storing section for storing the correction data thus calculated, and an image correcting section for correcting the images input to the respective projectors, by using the correction data.

U.S. Pat. No. 6,859,547 for METHODS AND COMPUTER-READABLE MEDIUM FOR TRACKING MOTION, issued Feb. 12, 2005 to Paul S. Mostert et al. and U.S. Pat. No. 6,975,748 for METHODS AND COMPUTER-READABLE MEDIUM FOR NAVIGATING BETWEEN A PLURALITY OF DISCRETE IMAGES, issued Dec. 13, 2005 to Paul S. Mostert et al. teach methods and a computer-readable medium for use in a computer system for tracking motion of a subject in an activity captured by camera. The camera supplies pluralities of discrete images of the subject to a computing system environment. An event window, displayed on a monitor, has at least two cells for receiving a user input pertaining to an action of the subject in the activity. In a first of the two cells, the user indicates a specific image number corresponding to one of the plurality of discrete images and an estimate of a fractional percent thereof. In the second cell, the user indicates another specific image number and estimate of a fractional percentage thereof. Software calculates a delta between the specific image numbers and their corresponding estimated fractions.

United States Published Patent Application No. 2005/0271299 for IMAGE TRANSFORMING METHOD, IMAGE TRANSFORMING DEVICE AND MULTI-PROJECTION SYSTEM, published Dec. 8, 2005 upon application by Takeyuki Ajito et al. teaches an image transforming device wherein one input image or a plurality of input images captured or created under different conditions are geometrically transformed to create an output image, including: an input geometrical profile calculating section to calculate an input geometrical profile directed to a coordinate relation between pixel positions of the input image and polar coordinate positions of the input image in view of a given observing position; an output geometrical profile calculating section to calculate an output geometrical profile directed to a coordinate relation between pixel positions of the output image and polar coordinate positions of the output image in view of the observing position; and geometrical transforming section to geometrically transform the input image on the input geometrical profile and the output geometrical profile, thereby calculating the output image.

U.S. Pat. No. 7,097,311 for SUPER-RESOLUTION OVERLAY IN MULTI-PROJECTOR DISPLAYS, issued Aug. 29, 2006 to Christopher O. Jaynes et al. discloses a technique, associated system and computer executable program code, for projecting a superimposed image onto a target display surface under observation of one or more cameras. A projective relationship between each projector being used and the target display surface is determined using a suitable calibration technique. A component image for each projector is then estimated using the information from the calibration, and represented in the frequency domain. Each component image is estimated by using the projective relationship, determining a set of sub-sampled, regionally shifted images, represented in the frequency domain. Each component image is then composed of a respective set of the sub-sampled, regionally shifted images. In an optimization step, the difference between a sum of the component images and a frequency domain representation of a target image is minimized to produce a second, or subsequent, component image for each projector.

U.S. Pat. No. 7,119,833 for MONITORING AND CORRECTION OF GEOMETRIC DISTORTION IN PROJECTED DISPLAYS, issued Oct. 10, 2006 to Christopher O. Jaynes teaches a technique, and associated system and computer executable program code on a computer readable storage medium, for automatically correcting distortion of a front-projected display under observation by at least one camera. Single or multiple projectors and cameras are used. The technique includes: observing a first image, projected from at least one projector, comprising at least one target distribution of light intensities; for each conglomeration of white pixels of a difference image; computing a bounding box comprising a corresponding conglomeration of pixels in a framebuffer information of the camera, compute a bounding box comprising a corresponding conglomeration of pixels in a framebuffer information of the projector; computing an initial homography matrix; mapping pixels of the projector's bounding box to those of the camera's bounding box; optimizing the initial homography matrix; computing a central location of the camera's bounding box using the initial homography matrix; and using a plurality of correspondence values comprising the correspondence, computing a corrective transform to aid in the automatic correcting of the display.

United States Published Patent Application No. 2007/0188719 for MULTI-PROJECTOR INTENSITY BLENDING SYSTEM, published Aug. 16, 2007 upon application by Christopher O. Jaynes et al. discloses projection systems where multiple projectors are utilized to create respective complementary portions of a projected image. An attenuation map is generated for the projectors and pixel intensity values are established for the projectors by applying one or more intensity transfer functions to the attenuation maps. The intensity transfer functions are configured to at least partially account for the non-linear response of the output intensity of the projectors, as a function of an input intensity control signal applied to the projectors.

United States Published Patent Application No. 2007/0195285 for HYBRID SYSTEM FOR MULTI-PROJECTOR GEOMETRY CALIBRATION, published Aug. 23, 2007 upon application by Christopher O. Jaynes et al. teaches projection systems where multiple projectors are utilized to create respective complementary portions of a projected image. A method is disclosed of calibrating a multi-projector image display system. According to the method, non-parametric calibration data for the display system is recovered and used to generate a non-parametric model of the display system. Local parametric models relating to the display surface of the projection screen are generated using canonical surface data representing the image projection screen. The local parametric models are compared with data points defined by the non-parametric calibration data to identify local errors in the non-parametric calibration data. The local errors are converted to data points defined at least in part by the local parametric models and the projectors are operated to project an image on the image projection screen by utilizing a hybrid calibration model comprising data points taken from the non-parametric model and data points taken from one or more local parametric models.

U.S. Pat. No. 7,133,083 for DYNAMIC SHADOW REMOVAL FROM FRONT PROJECTION DISPLAYS, issued Nov. 7, 2006 to Christopher O. Jaynes et al. teaches a technique and system for detecting radiometric variation/artifacts of a front-projected dynamic display region under observation by at least one camera. The display is comprised of one or more images projected from one or more of a plurality of projectors. The system is preferably calibrated by using a projective relationship. A predicted image of the display region by the camera is constructed using framebuffer information from each projector contributing to the display, which has been geometrically transformed for the camera and its relative image intensity adjusted. A detectable difference between a predicted image and the display region under observation causes corrective adjustment of the image being projected from at least one projector. The corrective adjustment may be achieved by way of pixel-wise approach (an alpha-mask is constructed from delta pixels/images), or bounding region approach (difference/bounding region is sized to include the area of the display affected by the radiometric variation).

United States Published Patent Application No. 2007/0268306 for IMAGE-BASED PARAMETRIC PROJECTOR CALIBRATION, published Nov. 22, 2007 upon application by Stephen B. Webb et al. discloses projection systems where one or more projectors are utilized to project a video, a still image, or combinations thereof. A method of calibrating an image display system is provided. The system comprises one or more projectors oriented to project an image on a projection screen and one or more image sensors oriented to acquire an image projected on the projection screen. The projector is operated to project a calibration image comprising one or more image fiducials on the image projection screen. The image sensor acquires the projected calibration image including the image fiducials. The respective positions of the image fiducials are identified and the identified fiducial positions are validated by applying a parametric model to compare respective ones of the identified fiducial positions with corresponding approximations of the identified fiducial positions. Corrected fiducial positions are generated when a result of one of the comparisons exceeds an error threshold.

None of the patents and published patent applications, taken singly, or in any combination is seen to teach or suggest the novel system and method for automatically aligning immersive displays of the present invention.

SUMMARY OF THE INVENTION

In accordance with the present invention there is provided a system and method for automatically aligning immersive displays. The immersive displays may be either traditional displays or helmet-mounted displays. Such displays typically create composite images projected from one or more projectors onto a screen. To provide a seamless, color balanced display wherein the transitions between image portions projected by a first and a second projector are imperceptible to a human eye, such display systems must first be calibrated. The results of the calibration are then used to apply necessary geometric and color/intensity corrections to each projected image segment.

In the system of the present invention, a novel gimbal-mounted camera/rangefinder apparatus located in front of the screen (for front projection systems) is used to create a three-dimensional (3D) model of a screen surface. The 3D model generally comprises an azimuth, elevation, and range component for each screen point. Resolution is controlled by the resolution of the gimbal (i.e., the minimum increments of azimuth, elevation, and range through which the camera/rangefinder may be moved). In the embodiment chosen for purposes of disclosure, resolution is approximately one arc-second. This resolution has been found to be fine enough to provide image corrections that render image variations imperceptible to most human eyes.

The 3D screen surface model is later used to generate geometric corrections of projected image segments. The rangefinder is typically a laser rangefinder and the laser element thereof is also used to display channel outlines of the screen to help with installation of the display system.

The novel gimbal-mounted camera/rangefinder is used to automatically analyze a test pattern projected onto the screen, typically without geometric correction. Each defined point of the test pattern may then be "moved" to its proper location on the 3D screen map. The movement required to move a point of a test pattern from an existing location to its correct location is the basis for correcting the projected image segment.

Video signal processing may be performed either in software or in hardware-implement image stretchers to accomplish geometric correction as well as edge blending between image segments, color (e.g., gamma) correction, and intensity matching. The novel system allows polygonal blend regions.

It is, therefore, an object of the invention to provide an automated system for aligning immersive displays wherein image segments from at least one image source are integrated into a single, geometrically corrected, seamless composite image on a screen.

It is another object of the invention to provide an automated system for aligning immersive displays wherein a gimbal-mounted camera/rangefinder assembly is used to create a three-dimensional map of a screen surface onto which a composite image is to be projected.

It is an additional object of the invention to provide an automated system for aligning immersive displays wherein a gimbal-mounted camera/rangefinder assembly is used to project channel outlines onto a screen.

It is a further object of the invention to provide an automated system for aligning immersive displays wherein a gimbal-mounted camera/rangefinder assembly may be positioned off-axis.

It is a still further object of the invention to provide an automated system for aligning immersive displays wherein edge blending of adjoining edges of adjacent display segments is performed using polygons.

It is yet another object of the invention to provide an automated system for aligning immersive displays wherein color (e.g., gamma) and brightness matching at adjoining edges of adjacent image segments are matched using a geometric shape displaying a gradient on intensities of each color that displays the full dynamic range of the display device, and having discrete steps to accommodate variations in the dynamic range of projector and cameras.

It is an additional object of the invention to provide an automated system aligning immersive displays that incorporates regional brightness/blemish correction.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein:

FIGS. 8*a* and 8*b* are "checkerboard" test patterns used for aligning an immersive display in accordance with the method of the invention.

DETAILED DESCRIPTION OF THE PREFERRED EMBODIMENT

The present invention provides a system and method for automatically aligning immersive displays.

Figure 1:
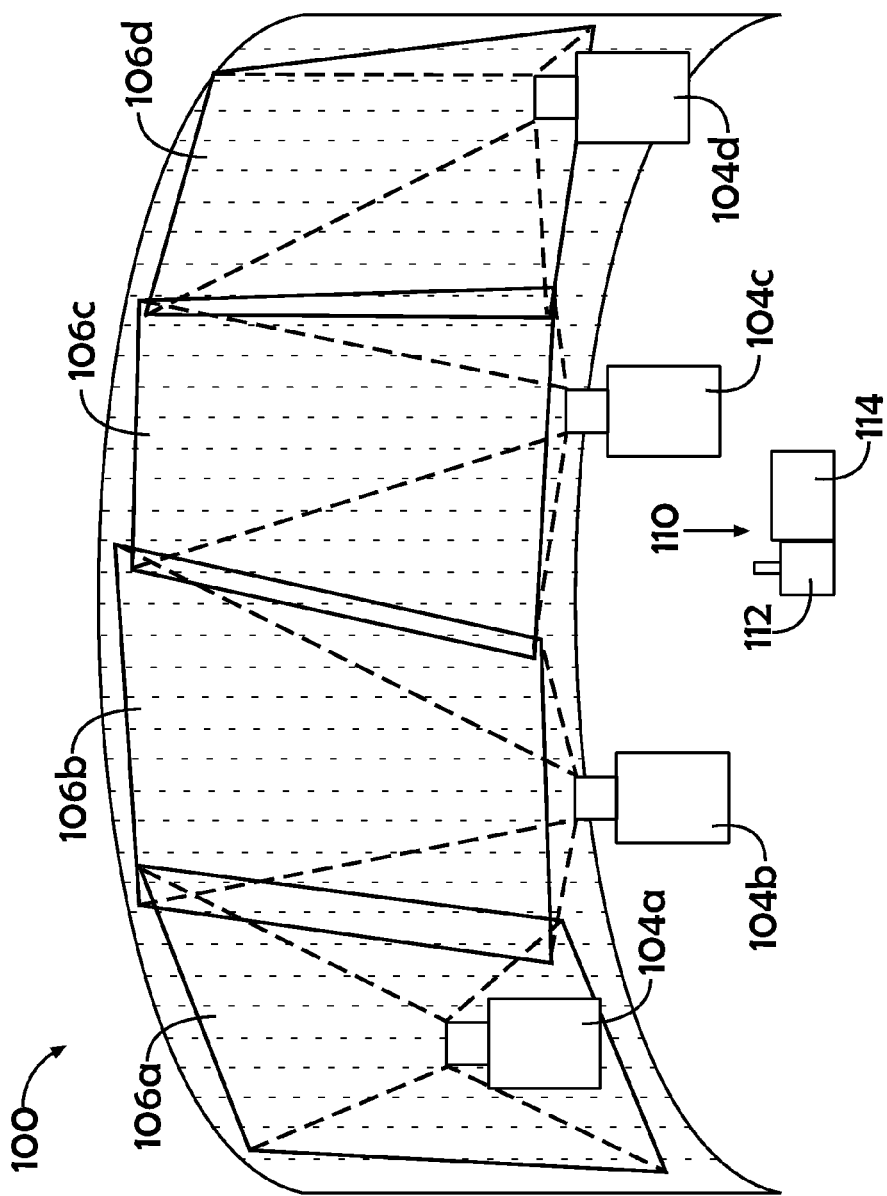
FIG. 1 is a schematic, perspective view of an immersive display system of a type with which the system and method of the invention may be utilized.

Referring first to FIG. 1, there is shown a schematic, perspective view of an immersive display system of a type with which the system and method of the invention may be utilized, generally at reference number 100. Immersive display 100 consists of a curved screen 102 and four projectors 104*a*, 104*b*, 104*c*, 104*d* disposed forward from a reflective surface, not specifically identified, of screen 102. While a front projection arrangement is illustrated in FIG. 1, it will be recognized that the system and method of the present invention may also be applied, with suitable modifications, to rear projections display systems. Consequently, the invention is not limited to the front projection display system used for purposes of disclosure. Rather the invention includes both front projection and rear projection display systems.

While immersive display 100 includes four projectors (104*a*, 104*b*, 104*c*, 104*d*), it will be recognized that the automatic alignment system of the invention may readily be used with displays having only a single projector or channel. The edge blending aspects of the inventive system are not required in such single projector systems. The system and method of the present invention are not, therefore, considered limited to multi-projector display systems. Rather, the invention also includes single projector systems.

Each projector 104*a*, . . . , 104*d* projects an image segment 106*a*, 106*b*, 106*c*, 106*d*, respectively on screen 102.

Figure 2:
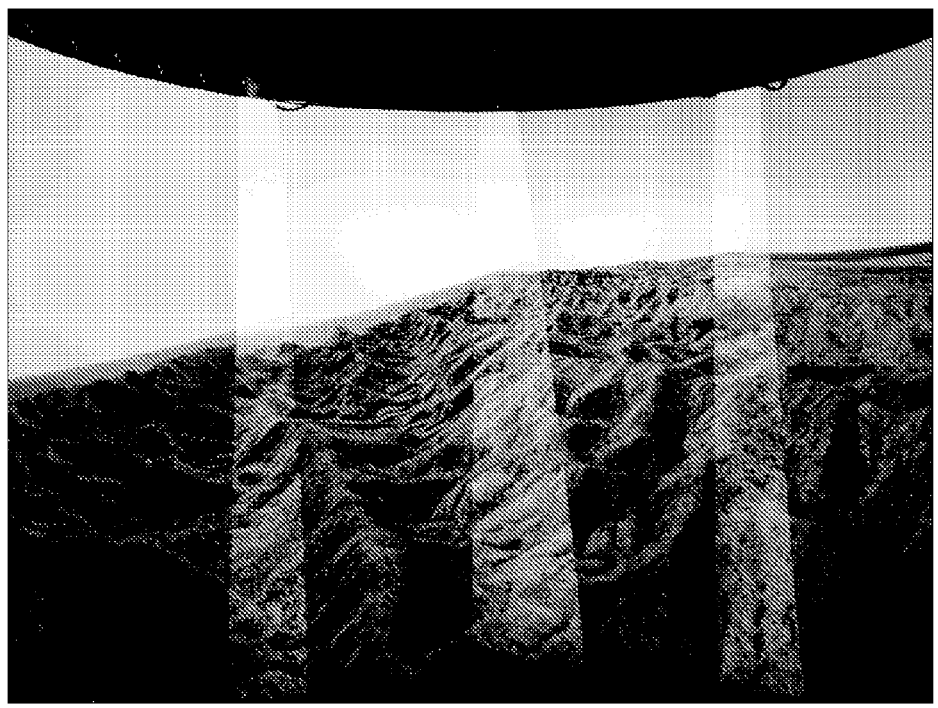
FIG. 2 is a front, elevational view of the screen of FIG. 1 having projected thereupon uncorrected image segments from the projector(s) of FIG. 1.

Referring now also to FIG. 2, there is shown a front, elevational view of screen 102 having projected thereupon image segments 106*a*, . . . , 106*d*. It will be recognized that the composite image segments 106*a*, . . . , 106*d* are uncorrected, the resulting composite images including distortions based upon projector placement and angle relative to the screen for each projector 104*a*, . . . , 104*d*, respectively, as well as variations in the source images 108*a*, . . . , 108*d* (FIG. 4) being projected.

The basic thrust of the present invention is to provide a system and method for automatically calibrating immersive display 100 so that image segments such as image segments 106*a*, . . . , 106*d* form a seamless, unified image, regardless of aforementioned factors. As is discussed hereinbelow, the present invention provides a novel calibration apparatus and method that allows compensation for all the aforementioned factors to achieve the desired unified image.

A calibration apparatus 110 is disposed forward of screen 102 for front projection systems. In rear screen projections systems, calibration apparatus 110 would typically be located behind an associated projection screen, not shown.

Figure 3A:
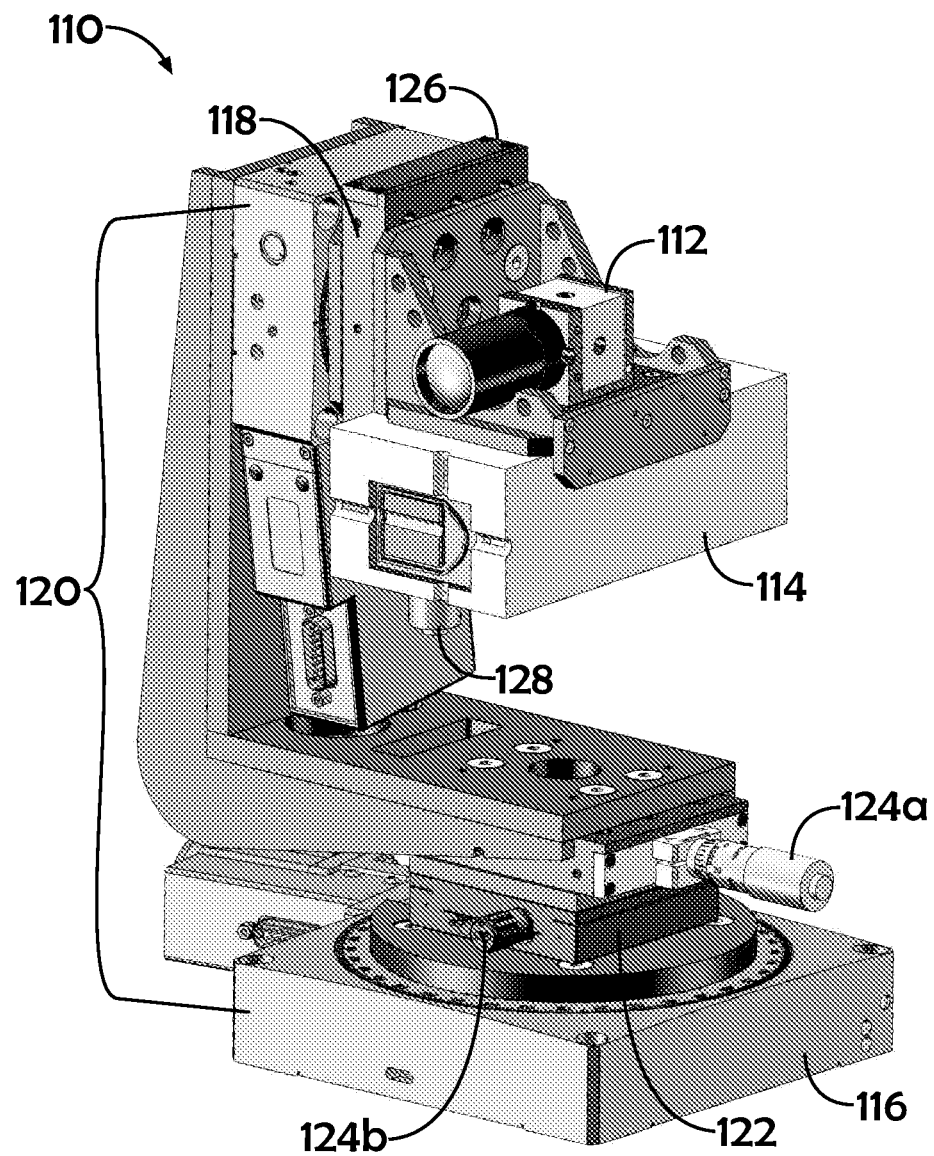
FIG. 3*a* is a perspective view of a gimbal-mounted calibration apparatus in accordance with the invention.

Referring now also to FIG. 3*a*, there is shown a perspective view of gimbal-mounted calibration apparatus 110 forming a portion of the invention. Calibration apparatus 110 consists primarily of a high resolution camera 112 and a laser rangefinder 114 coupled to and aligned with one another. A Model UI-2240 camera supplied by IDS Imaging Development Systems, Inc. of Woburn, Mass. has been found suitable for the application. The IDS UI-2240 camera is a CCD camera having approximately a 1280×1024 resolution and a USB output. It will be recognized by those of skill in the art that other suitable cameras from other manufacturers may exist and may, of course, be substituted for the camera 112 chosen for purposes of disclosure. The invention is not considered limited to a particular camera model and/or resolution or electrical output.

Rangefinder 114 is a Model PMS201 device supplied by Dimetix AG, Degersheimerstr 14, CH-9100 Herisau, Switzerland. It will be recognized that other suitable devices from other manufactures may be available and such devices may be substituted for the Dimatex unit chosen for purposes of disclosure.

Camera 112 and laser rangefinder 114 are mounted on a gimbal mechanism 120 consisting of a pair of precision rotation stages 116, 118 that are connected to one another at right angles. Precision rotary stages 116, 118 found suitable for the application are supplied by Newton Corporation of Irvine, Calif. as catalog numbers URS150 and URS75, respectively. A three-axis motion controller/driver, not separately identified, is operatively connected to precision rotation stages 116, 118 and used to actuate precision rotation stages 116, 118. A Newton Corporation Model ESP300 controller has been found suitable for this application. Precision rotation stages 116, 118 in combination form a precision gimbal, identified by reference number 120.

Precision rotation stage 116 allows rotation of camera 112 and rangefinder 114 through a complete 360° range of azimuth. Precision rotation stage 118 provides motion in an orthogonal plane in a range of −45 degrees to +90 degrees (i.e., a total range of approximately 135 degrees) of elevation. Gimbal 120 may be designed to selectively provide a geometric accuracy of between approximately one and five arc minutes. A geometric accuracy of approximately one arc minute is assumed in the gimbal 120 chosen for purposes of disclosure. Gimbal 120 is said to have a pointing axis, typically defined at a position of 0° azimuth and 0° elevation.

Gimbal 120 may include a lower linear stage 122 disposed between precision rotation stage 116 and precision rotation stage 118. Linear stage 122 typically includes a pair of micrometer-type adjustors 124a, 124b, respectively, configured to move linear stage 122 along an x and a y-axis, respectively.

Likewise, an upper linear stage 126 may be disposed between lower linear stage 122 and camera 112/rangefinder 114. Upper linear stage 126 includes a single micrometer adjustor 128 for adjusting upper linear stage 126 along the z-axis.

Camera 112 and rangefinder 116 are both physically aligned with and calibrated to gimbal 120 such that their respective optical centers, not specifically identified, are aligned with the pointing axis. Gimbal 120 allows camera 112/rangefinder 114 to be accurately pointed to any specific angle in two dimensions (i.e., azimuth and elevation).

Figure 3B:
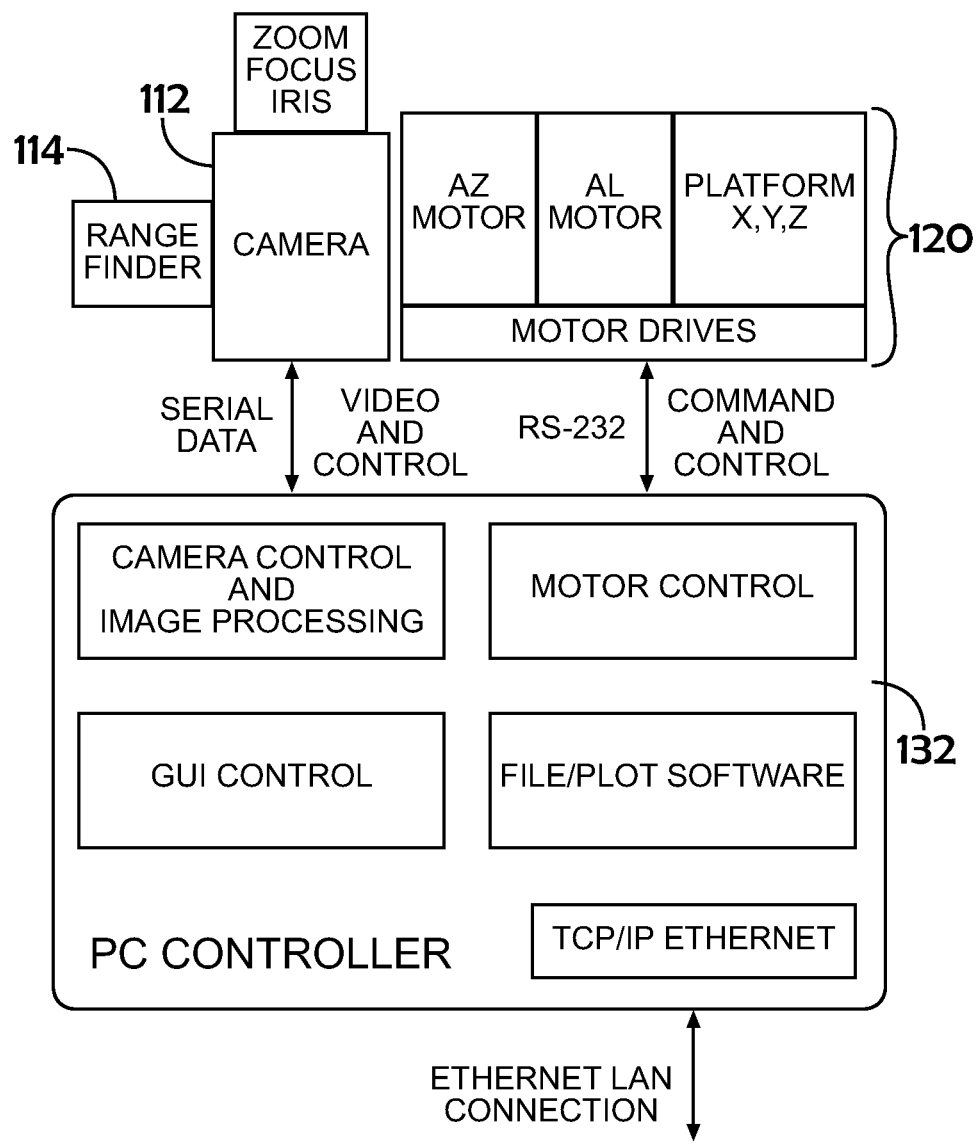
FIG. 3*b* is a simplified schematic block diagram showing the interconnection of the components of the calibration apparatus of FIG. 3*a* to other system components.

Referring now also to FIG. 3b, there is shown a simplified schematic block diagram showing the interconnection of the components of calibration apparatus 110 to other system components. Camera control electronics 132 (see also FIG. 4) are used to facilitate software control of camera 112 and/or laser rangefinder 114 allowing camera 112 and rangefinder 114 to be pointed at any region of screen 102. When so pointed, a measurement of the distance to the specific point on the screen may be made. Alternately, camera 112 may be used for feedback from a projected test pattern, etc.

Figure 4:
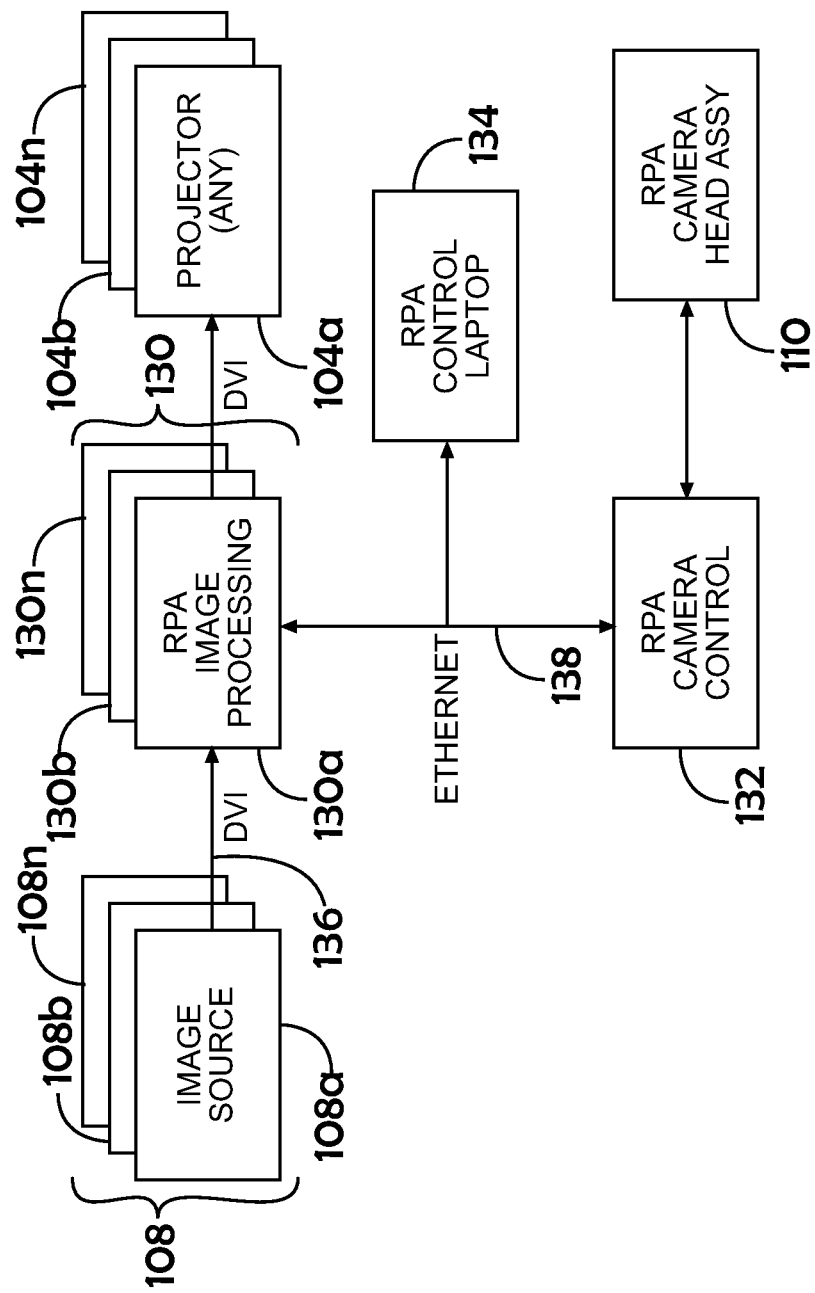
FIG. 4 is a simplified block diagram of the system of the invention.

Referring now also to FIG. 4, there is shown a simplified functional block diagram of the display calibration apparatus in accordance with the present invention.

Input multiple images 108a, 108b, . . . , 108n are provided to an image processing system 120, typically via a digital video interface (DVI) 136. It will be recognized by those of skill in the art that any appropriate video signal interface/transmission methodology and be substitute for the DVI interface chosen for purposes of disclosure.

Image processing system 130 comprises multiple channels of image processing capability designated 130a, 130b, . . . , 130n). Each channel 130a, 130b, . . . , 130n of image processor typically includes an image warper, an image blender, and a color/intensity matcher, as well as test pattern generation capability. These functions, optionally, may be implemented either in a hardware device or as software running on an appropriate processor. In some cases one or more of the aforementioned functions may be performed on a combination of hardware and software. Neither a hardware device nor a software system is specifically identified and for purposes of disclosure, a hardware system, a software system, or a hybrid hardware/software implementation may be utilized.

A control computer 134 is operatively connected to image processing system 130 as well as to camera control system 132, typically via an Ethernet connection. It will be recognized that any known interconnection strategy may be used to operatively interconnect computer 134, image processing system 130, and camera control system 132. Consequently, the invention is not considered limited to the Ethernet interconnection 138 used for purposes of disclosure. Control computer 134 typically includes a graphical user interface (GUI), not shown, for accepting information from a user thereof. Control computer 134, running control software, not shown, allows user input from the GUI to be converted to control commands for camera control system 132 and/or image processing system 130.

Figure 5:
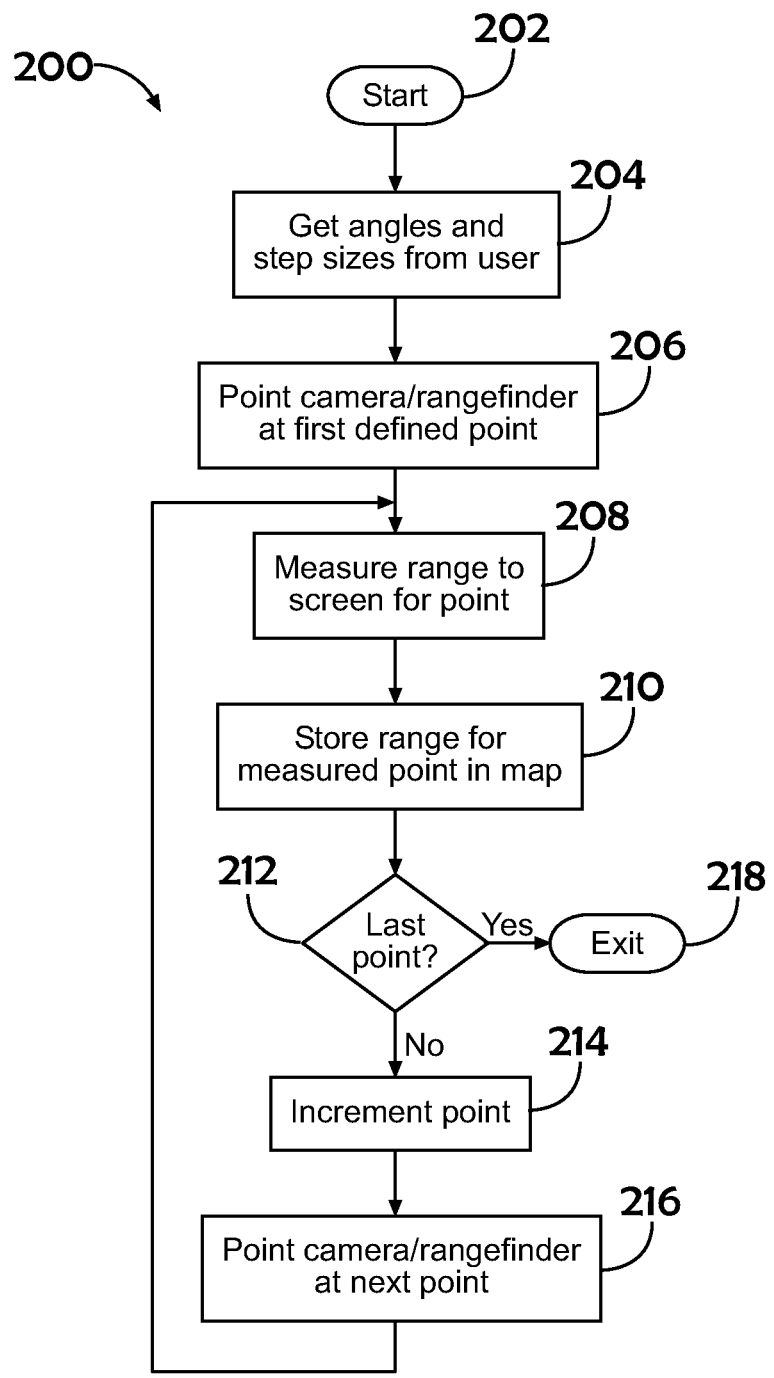
FIG. 5 is a simplified flowchart showing the steps for creating a three-dimensional screen map.

Calibration apparatus 110 allows the creation of a three-dimensional map of the surface of screen 102. Referring now also to FIG. 5, there is shown a simplified flowchart of the steps involved in creating the 3D screen map, generally at reference number 200. The 3D mapping process is started, block 202, by a user defining a screen region, specifically a range of angles (azimuth and elevation) within which the mapping is to take place. The user must also specify a step size to define the increment between map points in each angular direction, block 204.

The camera 212/rangefinder 214 is pointed at the first of the selected points defined by the user, block 206.

The range from the rangefinder 214 to the selected point on screen 202, block 208, and the range to the point is stored in the 3D screen map, not shown, block 210.

If the point just measured is the last point in the defined range, block 212, the process is terminated, block 218. If however, the last point processed, block 212, is not the last point in the user selected range, block 204, the point is incremented (i.e., the next point in the user selected range is selected), block 214.

The camera 21/rangefinder 214 is next pointed at the newly selected point, block 216, and control is transferred to block 208.

The process continues until all points in the user selected range are mapped.

The measured data for the measured points is typically organized into rows and columns (i.e., the 3D map is a two-dimensional matrix).

While a 3D screen map is typically generated as part of the process for applying corrections to images segments 106a, 106b, . . . , 106n for display on screen 102 of immersive display 100, it has other purposes as well. The process 200 of FIG. 5 may be used independently for screen evaluation (e.g., quality assurance, etc.) in a manufacturing environment and for acceptance testing of screens prior to installation in immersive displays such as immersive display 100.

As discussed hereinabove, the 3D map is typically a two-dimensional matrix having elements corresponding to locations on the screen surface expressed as x, y, and z coordinate pairs. Once the 3D map is generated, the data may be subjected to statistical processing. For example maximum and minimum data may be compared to predetermined go/no-go values. A mean and a standard deviation or some similar statistic may be generated for the value and, likewise, compared to predetermined values to determine the acceptability of a particular screen.

In immersive displays such as display 100 of FIG. 1, there is a design viewer position, not shown. A viewer placed at the design viewer position typically obtains optimum viewing results (i.e., proper perspective, orientation, etc.) from immersive display 100. The viewer design point is defined in 3D space within immersive display 100. This 3D space is referred to as the viewing volume of the immersive display 100.

There is no requirement that calibration apparatus 110 be placed at the design viewer position. However, when calibration apparatus 110 is located away from the design viewer position, compensation based upon the offset of the calibration apparatus 110 from the design viewer position must be provided. However, the location of calibration apparatus 110 within 3D space (i.e., the viewing volume) must also be accurately known.

Figure 6:
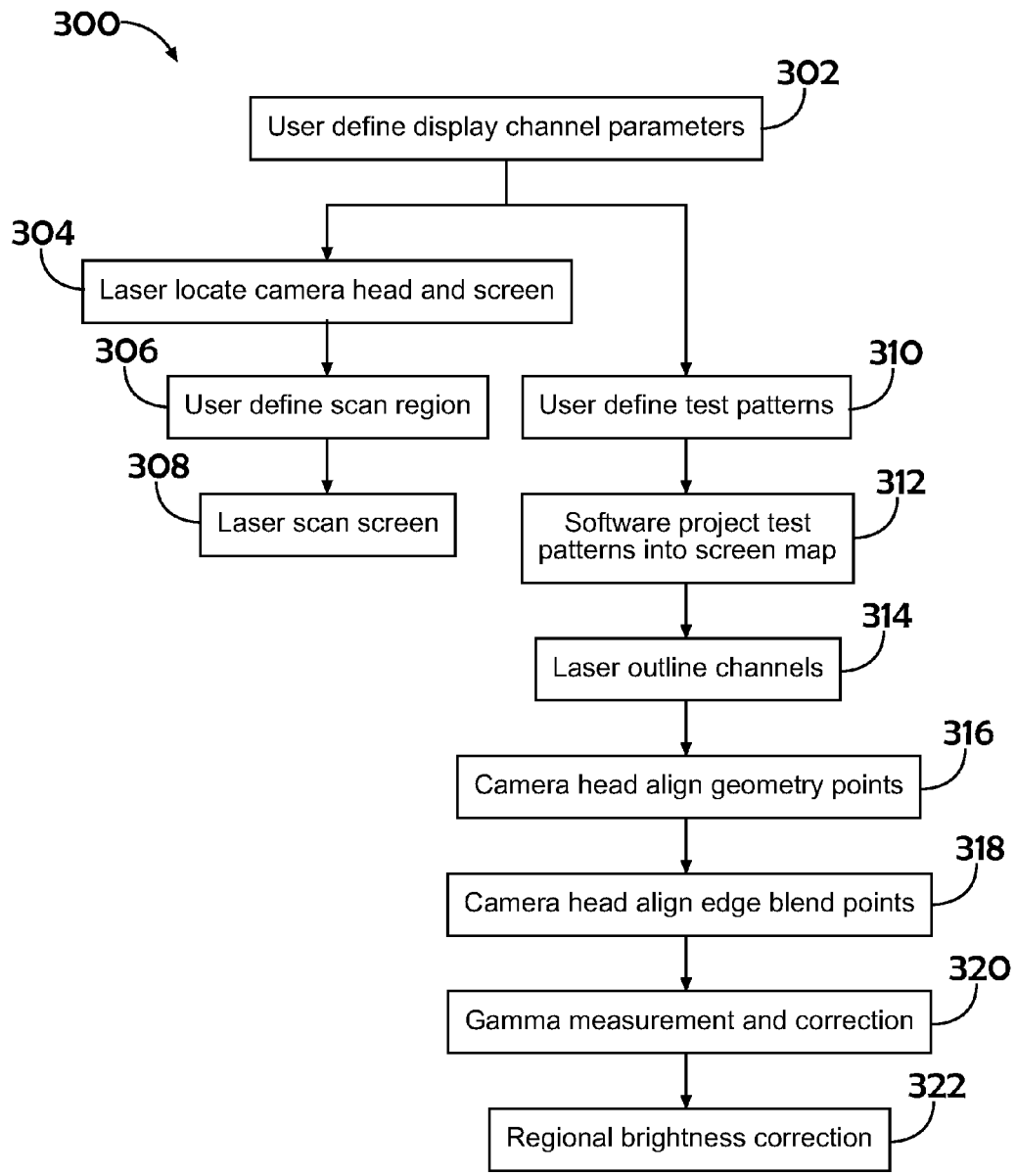
FIG. 6 is a simplified flow chart of an immersive display setup procedure in accordance with the invention.
Figure 7A:
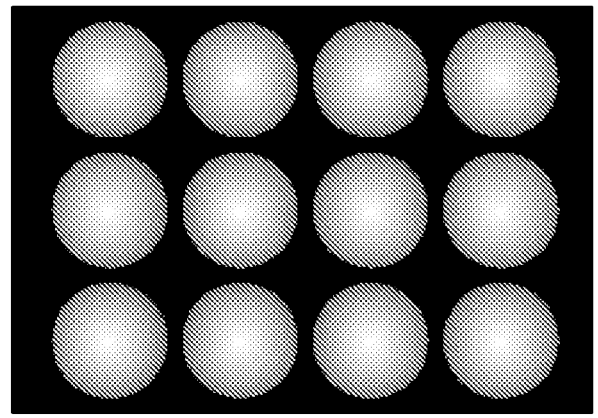
FIGS. 7*a* through 7*d* are four conical test patterns used for aligning an immersive display in accordance with the method of the invention.
Figure 7B:
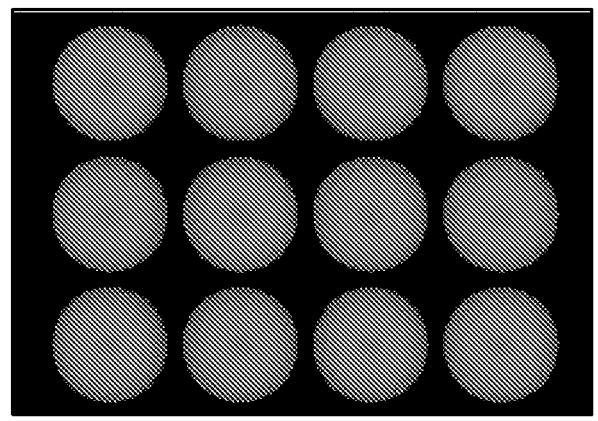
Figure 7C:
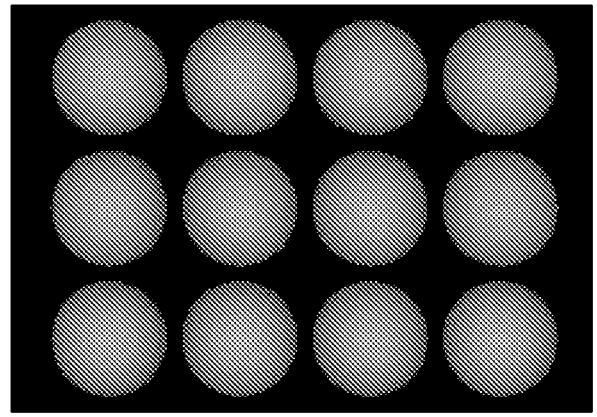
Figure 7D:
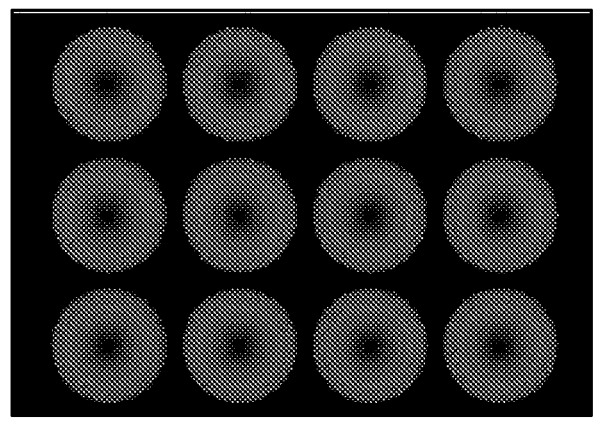

Referring now also to FIG. 6, there is shown a simplified flow chart of the display setup procedure, generally at reference number 300.

Each section of an image to be projected on screen 102 by each projector 104a, 104b, . . . , 104n is defined by the region, or field of view, that it must cover to provide immersive display system 100 with proper image perspective in each channel. As used herein, the term display channel refers to a projector and all associated image processing necessary to display an image segment (e.g., image segments 106a, 106b, . . . , 106n) on the screen 102.

To properly display each image segment, several pieces of information must be defined. First, the user must define display channel parameters for each required display channel, block 302. Required channel parameters are one or more of the parameters: Horizontal field of view ($F_{fov}$), Vertical field of view ($V_{fov}$), and image orientation in three dimensions (expressed as azimuth, elevation, roll, or as pitch, roll, and yaw). Next, the laser, not specifically identified, of laser rangefinder 114 is used to define the location of calibration apparatus 110 relative to screen 102, block 304.

Once calibration apparatus 110 is located, block 304, the user must supply coordinates defining a scan region of the screen, block 306.

Once scan region coordinates are supplied, block 306, a laser scan of the screen is performed, block 308. Such screen scanning is described in detail hereinabove in conjunction with a discussion of FIG. 5. The result of the screen scanning is a 3D map of the surface of screen 102.

The user must also define test patterns to be used for the alignment operation, block 310.

Once the laser screen scan, block 308, is complete and test patterns are defined, block 310, one or more selected test patterns, block 310, are projected onto screen 102, block 312.

The laser of laser rangefinder 114 is used to outline user-defined channel regions on screen 102, block 314.

Calibration apparatus 110 is next used to align points of a displayed test pattern, block 316. This process is described in greater detail hereinbelow.

Calibration apparatus 110 is next used to align edge blend points, block 318.

Finally, gamma matching is performed, block 320, followed by regional brightness correction, block 322.

A more detailed description of the immersive display setup of the simplified flow chart of FIG. 6 is now provided. First, an offset vector and orientation is specified defining where the calibration apparatus 110 is located relative to the design eyepoint in 3D space.

Next, each image segment 106a, 106b, . . . , 106n must have a field of view and orientation defined to provide the system with the overall size thereof as it is intended be viewed at the design eyepoint.

For multiple image segments 106a, 106b, . . . , 106n, the displacement of each image segment 106a, 106b, . . . , 106n (angular) form the design eyepoint is also defined to provide the layout of all image segments 106a, 106b, . . . , 106n with respect to one another.

Image processor 130 is used to generate test patterns to aid in channel setup and alignment. For geometric alignment, a test grid is used to provide a linear representation of the image space in horizontal and vertical dimensions. The user must specify the number of horizontal/vertical test points in the test grid to be used. These numbers may be varied to trade off system accuracy versus the amount of time required to perform a total system alignment. More points require more time.

Using these channel field of view, test pattern definitions, and calibration apparatus 110 to design eyepoint offset data, software mathematically projects each point in the test pattern into the measured 3D screen map and calculates the intersection of a ray from the design eyepoint passing through each test pattern angular offset to the screen map. The resultant intersection is then used to calculate the required angles for camera 112 to view each point on the screen 102 surface.

Channel definitions include a horizontal field of view (degrees) and associated number of horizontal alignment test points. The separation between adjacent points from the design eyepoint may then be expressed as: where:

$$A_{gridH} = H_{fov}/(N_{Hgrid\ points} - 1)$$

where:
$A_{gridH}$ is the horizontal separation in degrees;
$H_{fov}$ is the horizontal field of view in degrees; and
$N_{Hgrid\ points}$ is a scalar value representing the number of points per row.

Similarly, in the vertical channel, dimension may be expressed as:

$$A_{gridV} = V_{fov}/(N_{Vgrid\ points} - 1)$$

where:
$A_{gridV}$ is the vertical separation in degrees;
$V_{fov}$ is the vertical field of view in degrees; and
$N_{Vgrid\ points}$ is a scalar value representing the number of points per column.

An important feature of the automated system for automatically aligning immersive displays of the invention is the ability to present channel outlines on screen 102. Rangefinder 114 uses a visible spectrum ranging device that the system uses to outline a region on screen 102 to outline the visible portion of each display channel to aid in system setup.

From the list of points in the alignment grid test pattern, the user defines those that will be visible in the complete image. The calibration apparatus 110, specifically rangefinder 114, is then used during system alignment to draw a visible outline of each channel (i.e., image segment 106a, 106b, . . . , 106n) on the surface of screen 102. Drawing this outline allows a system installer to quickly set up display channels to fill the required regions of the display for each channel to provide the images to be displayed.

Geometric alignment of each channel may then be performed using the calculated data for each test pattern grid point. The result of this process is a set of angles (azimuth and elevation) from the calibration apparatus 110 to each alignment point. The camera 112 is then moved to the proper angles for each point, and the point is moved via software control between the camera 112 and the image processing system 130, to move each point to the center of the field of view of camera 112.

In the embodiment chosen for purposes of disclosure, the system displays and processes test pattern points one at a time. It will be recognized that in other embodiments of the novel system, multiple test points may be displayed and/or processed simultaneously. Consequently, the invention is not considered limited to the embodiment chosen for purposes of disclosure wherein only a single test point at a time is displayed and processed. Rather, the invention includes the processing of any number of test points simultaneously.

Depending upon the display to screen physical setup, some alignment points may not be visible on screen 102. In this case, non visible points may be calculated after all visible points have been aligned using camera 112 of calibration apparatus 110. This may be performed by mathematically extrapolating non-visible point locations from adjacent points that were aligned by camera 112.

As previously stated, the intention in immersive displays is to present a seamless image from two or more image segments. Seams between adjacent channels (i.e., image segments) must be optically matched to eliminate visible lines at the borders. The system uses polygon shapes in image processor 130 to overlay in the seam layers. Each polygon defines a shape of overlap in which the scene is attenuated to reduce the intensity to the channel edge from scene intensity to black at the outer edge.

The camera 112 is pointed to the center of each blend zone region. The attenuation throughout each blend zone can be varied via camera feedback to match the brightness drop off of each channel so as to minimize light variation from a normal scene across the blend zone.

In adjacent channels, the points that define each blend polygon are overlaid on one another on the screen to ensure consistent blending. While polygonal blend regions have been chosen for purposes of disclosure, it will be recognized by those of skill in the image processing arts that any arbitrary blend region shape may alternately be chosen. The invention is not, therefore, limited to the polygonal blend regions chosen for purposes of disclosure. Rather the invention is seen to cover blend regions of any shape.

In order to match the display of each channel and blend seams correctly, the brightness light response of each display channel to input signal must be measured. To accomplish this task, the system displays unique test patterns from the image processing subsystem 130 in the form of conical shapes, in the preferred embodiment, varying from black to peak white at various regions of the display. The displayed conical patterns are linear in the input signal to each display, and present an image small enough to fit within the field of view of camera 112. FIGS. 7*a*-7*d* illustrate examples of such conical patterns.

It will, however, be recognized that other geometric shapes exhibiting the entire dynamic range of a channel may be substituted for the conical pattern chosen for purposes of disclosure. The invention is not considered limited to the conical patterns. Rather, the invention includes any geometric pattern that exhibits the entire dynamic range of the display.

Once these patterns are displayed, camera 112 is pointed toward each cone, and measures the black level, peak white level, and light response to linear input, providing the system 'gamma' response for each display. Based on the response of camera 112, the gamma response of each channel may be adjusted electronically to make each color response of each channel match the desired, previous user defined gamma response.

Figure 8A:
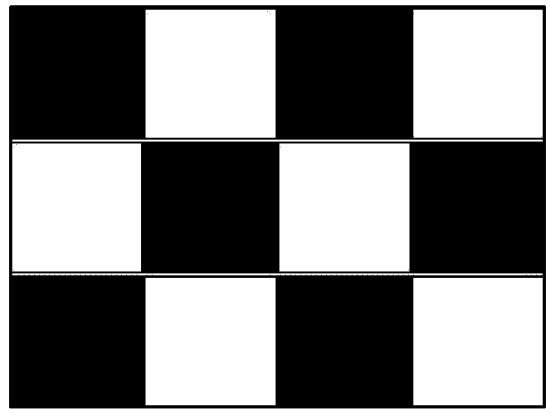
Figure 8A:
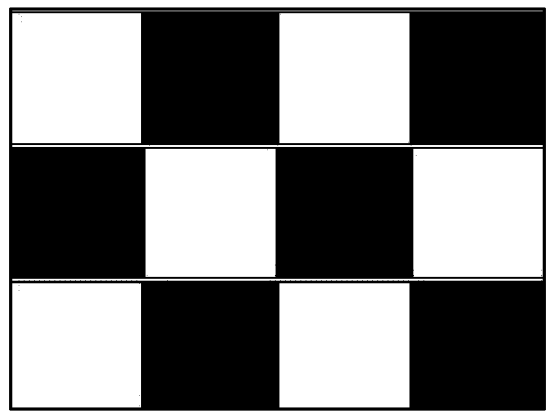

Once gamma adjustments are complete, regional brightness (i.e., blemish) correction may be applied to the system. A checkerboard pattern (FIG. 8*a*) is displayed across each display channel. Camera 112 is then pointed at the white squares in the pattern and brightness uniformity across each square is measured. If the brightness is not within a user defined tolerance, the regional brightness is adjusted using feedback from camera 112 and the image processing subsystem 130 to bring each region within a brightness tolerance.

The image processing subsystem 130 provides a grid of points throughout each channel supporting independent gain values for red, green, and blue intensity control at each grid point. The gain value is interpolated between adjacent grid gain values to provide a smooth transition from one to another.

Following adjustment of all white squares in the pattern to achieve desired brightness uniformity, an inverse checkerboard pattern (FIG. 8*b*) is then displayed wherein previous white/black squares are reversed. The feedback procedure is then performed on this checkerboard to cover all regions of the screen.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. In an immersive display having a screen and an image source located proximate said screen and adapted to project an image comprising a plurality of grid points thereupon, the improvement comprising:
   a) an automated immersive display calibration system, comprising:
      a) a calibration apparatus located proximate said screen, comprising:
         ii) a camera;
         ii) a rangefinder attached to said camera, said rangefinder adapted to scan an entire region of interest to determine the absolute coordinates of each of said grid points and to build a 3D surface map of said screen based solely on said absolute coordinates of each of said grid points without the aid of said camera; and
         iii) means for moving said camera and rangefinder azimuthally and elevationally;
      b) an image processor operatively connected to said image source, said camera, and said rangefinder, said image processor calculating a mechanical offset of said camera and said rangefinder; and
      c) a control system operatively connected to said calibration apparatus, said image processor, and said image source.

2. The automated immersive display calibration system as recited in claim 1, wherein said image source and said calibration apparatus are disposed in one of the locations chosen from the group: in front of said screen, and behind said screen.

3. The automated immersive display calibration system as recited in claim 2, wherein said image source comprises a projector.

4. The automated immersive display calibration system as recited in claim 2, wherein said means for moving said camera and rangefinder azimuthally and elevationally comprises a pair of precision rotation stages disposed normally to one another.

5. The automated immersive display calibration system as recited in claim 4, wherein each of said pair of precision rotation stages is adapted to move said camera and said rangefinder in steps, resulting in resolutions of approximately one arc-minute.

6. The automated immersive display calibration system as recited in claim 4, wherein said rangefinder comprises a laser rangefinder, a laser thereof operating within a visible portion of the electromagnetic spectrum.

7. The automated immersive display calibration system as recited in claim 6, wherein said laser rangefinder comprises means for drawing at least a channel outline, said means for drawing working cooperatively with said means for moving, said image processor, and said control system.

8. The automated immersive display calibration system as recited in claim 1, wherein said immersive display comprises an eye design point disposed in front of said screen and wherein said calibration apparatus may be disposed at a location other than at said eye design point.

9. The automated immersive display calibration system as recited in claim 1, wherein said image source comprises at least two image sources.

10. A method for creating a three-dimensional map of a screen comprising a plurality of grid points in an immersive display, the steps comprising:
  a) providing an automated calibration system, comprising:
    i) a camera and a rangefinder mechanically coupled thereto, said camera and rangefinder being mounted to means for moving said camera and said rangefinder both azimuthally and elevationally; and
    ii) a control system electrically coupled to said means for moving;
  b) positioning said calibration apparatus proximate said screen;
  c) obtaining from a user of said calibration system information defining a region of said screen to be mapped, said information comprising a range of azimuth and elevation angles;
  d) using said means for moving, pointing said camera and said rangefinder to a first of said angles of azimuth and elevation;
  e) calculating a mechanical offset between said camera and said rangefinder;
  f) using only said rangefinder to measure the distance to said point on said screen as a function of said calculated mechanical offset and defined by said first of said angles of azimuth and elevation;
  g) building a 3-D map defined by said measured distance and said angles of azimuth and elevation; and
  h) storing said measured distance.

11. The method for automatically calibrating an immersive display as recited in claim 10, the steps further comprising:
  i) selecting the next of said angles of azimuth and elevation; and
  j) repeating said steps (d) through (i) until all of said angles of azimuth and elevation have been traversed.

12. The method for automatically calibrating an immersive display as recited in claim 11, wherein said storing step (h) comprises storing said measured distance in a matrix, said matrix comprising a three-dimensional map of said screen.

13. The method for automatically calibrating an immersive display as recited in claim 12, the steps further comprising:
  k) performing a mathematical operation on said matrix representing said three-dimensional map of said screen; and
  l) comparing a result of said performing a mathematical operation step (k) to a predetermined value to ascertain the acceptability of said screen.

14. The method for automatically calibrating an immersive display as recited in claim 13, wherein said performing a mathematical operation step (k) comprises performing at least one statistical operation selected from the group: finding a minimum value, finding a maximum value, determining a mean, and determining a standard deviation.

15. A method for automatically calibrating an immersive display comprising a screen and an image source disposed to project a respective 3-D image segment on said screen, said immersive display having a viewing volume, the steps comprising:
  a) providing an automated calibration system, comprising:
    i) a camera and a rangefinder comprising a laser, said rangefinder being mechanically coupled to said camera, said camera and rangefinder being mounted to means for moving said camera and said rangefinder both azimuthally and elevationally;
    ii) a control system electrically coupled to said means for moving; and
    iii) an image processing system coupled to said camera, said image source, and said image processor;
  b) obtaining information relating to said image source;
  c) using said calibration apparatus to obtain a three-dimensional map of at least a portion of a surface of said screen;
  d) projecting a test pattern onto said screen using said three-dimensional map;
  e) using said laser of said rangefinder to draw an outline of at least one channel on said screen; and
  f) using said calibration apparatus to geometrically align points of said projected test pattern based, inter alia, on a mechanical offset measurement between said camera and said rangefinder.

16. The method for automatically calibrating an immersive display as recited in claim 15, the steps further comprising:
  g) after said using step (e), using said calibration apparatus to gamma correct at least two points of said projected test pattern.

17. The method for automatically calibrating an immersive display as recited in claim 15, the steps further comprising:
  g) after said using step (e), using said calibration apparatus to perform regional brightness correction on at least one region of said projected test pattern.

18. The method for automatically calibrating an immersive display as recited in claim 15, the steps further comprising:
  g) performing at least one of the processes chosen after said using step (e) from the group: using said calibration apparatus to gamma correct at least two points of said projected test pattern, and using said calibration apparatus to perform regional brightness correction on at least one region of said projected test pattern.

19. The method for automatically calibrating an immersive display as recited in claim 18, the steps further comprising:
  h) projecting image segments onto said screen from at least two of at least two image sources, the region between each of adjacent ones of said at least two image segments defining a blend region; and
  i) performing a blending operation in at least one of said blend regions.

* * * * *